United States Patent [19]

Marra

[11] 4,172,056

[45] Oct. 23, 1979

[54] COMPOSITE OF RESINATED HYDRAULIC CEMENT AND WOOD

[76] Inventor: Alan A. Marra, 444 Montague Rd., Amherst, Mass. 01002

[21] Appl. No.: 823,828

[22] Filed: Aug. 11, 1977

[51] Int. Cl.$^2$ ............................................... C08L 1/02
[52] U.S. Cl. ................................... 260/17.2; 428/529
[58] Field of Search ........................ 260/17.2; 428/529

[56] References Cited

U.S. PATENT DOCUMENTS

| | | | |
|---|---|---|---|
| 2,594,280 | 4/1952 | Beaudet | 260/17.2 |
| 2,691,003 | 10/1954 | Bouvier | 260/17.2 |
| 3,216,966 | 11/1965 | Collins et al. | 260/38 |
| 3,271,492 | 9/1966 | Elmendorf | 264/122 |
| 3,502,610 | 3/1970 | Thompson | 260/38 |
| 3,557,263 | 1/1971 | Marra | 264/45 |
| 3,671,377 | 6/1972 | Marra | 428/529 |
| 3,674,219 | 7/1972 | Harvey, Jr. | 241/152 R |
| 3,718,285 | 2/1973 | Dang | 241/28 |

OTHER PUBLICATIONS

Chem. Absts., vol. 74:57032u, Structural Material, Pagitz.
Chem. Absts., vol. 75:22846f, Use of Filled P-F Resin for Preparing Particle Board, Somennikova.
Chem. Absts., vol. 83:136420h, Wood Chip-Based Cement Board, Nishimura.
Chem. Absts., vol. 84:110632z, Cement-Wood Boards, Cherubim et al.
Chem. Absts., vol. 85:9753k, Pozzdanic—Structural Composition, Donnelly et al.
Chem. Absts., vol. 85:112195d, Molding Compounds, Foley et al.
Chem. Absts., vol. 85:165721d, Shaped Cement Articles, Cherubim.
Chem. Absts., vol. 85:9756p, Interior Building Material, Ohtsuka.

*Primary Examiner*—Edward M. Woodberry
*Attorney, Agent, or Firm*—Ian C. McLeod

[57] ABSTRACT

Composite products formed from at least one piece of wood and a resinated hydraulic cement and the method for their preparation are described. The predominantly mechanical bond between wood and hydraulic cement achieved by the prior art is significantly improved because of the presence of a thermoset resin in the cement such that adhesion occurs at the wood-cement interfaces by specific action of the resin, and a bond of greater integrity results. The cement and the resin function synergistically to consummate a bond with the wood wherein the resin performs the adhesion action and the cement performs a reactive filler or bulking action. The resulting composite products are stronger, more durable and can be made at lower densities than prior art products.

12 Claims, No Drawings

COMPOSITE OF RESINATED HYDRAULIC CEMENT AND WOOD

SUMMARY OF INVENTION

The present invention relates to composite products of wood and resinated cement and the method for their preparation. It particularly relates to multiple wood piece-cement composite products with a minor amount of thermoset resin in the cement which adheres to the wood pieces at the wood-cement interface so as to bond them durably together.

PRIOR ART

In the prior art of forming composite products, various pieces of wood (in the form of sheets, fibers or strands and the like) are bonded with each other or with another material with an adhesive or bonding agent. Usually the bonding agent is primarily composed of a resin as a major portion of the binder because it adheres well to the wood. My U.S. Pat. No. 3,557,263 describes such composite products, formed of bonded fibrillated wood sticks and various resin bonding agents, which are particularly useful; however, there are many other prior art patents. A major problem in such prior art is the heavy dependence upon petrochemicals to form the resin bonding agents and the high cost of such resin bonding agents in relation to low cost of the wood. The attempt has been to reduce the binder cost using low cost fillers such as clay, flour, and finely ground solids. A further prior art problem in the use of resins, obviated in my patents, is the need to apply high pressure and sometimes heat to consolidate the composite, thus complicating the process, limiting its usefulness, and further adding to the cost.

Prior art attempts, such as that represented by U.S. Pat. No. 3,271,492 to Elmendorf (1966) "Method of Making a Non-porous Board Composed of Strands of Wood and Portland Cement", to produce composites using low cost hydraulic cements as binders have met with some success, but only insofar as the wood functions as a lightweight aggregate in which the cement is the major phase comprising around 80% of the weight of the composite, and providing virtual embedment for the wood. In such cases, a true adhesive bond between wood and cement is not crucial to the designed performance of the product. However, in cases where the cement binder comprises a relatively lower proportion of the weight of the composite, and does not provide embedment for the wood particles, as for example in laminate constructions, adhesion between binder and wood is a necessary element in the usefulness of the composite.

Prior art wood-cement composites employ pretreatment of the wood to improve compatibility with the cement. The improvement however is only in compatibility, such that interference with hardening of the cement is reduced from that of untreated wood. Such treatments, while improving the mechanical interlocking bond between wood and cement, does nothing for the physicochemical adhesion bond necessary for maximum strength and durability. The use of the present invention makes possible the formation of wood-cement composites without the need for pretreating the wood as will be seen from the following description.

U.S. Pat. No. 3,216,966 to Collins et al describes hydraulic cement and thermosetting resin compositions in admixture with a mineral aggregate. Once this product is hardened it is very heavy and not nailable, or sawable; hence not amenable to conventional building construction. There was no recognition of the usefulness of such compositions for bonding wood and no such composite wood products are disclosed. Where composites of wood or other materials are to be formed, the prior art has instead used various resins such as urea, phenol, epoxy and vinyl resins. The resorcinolic resin described in U.S. Pat. No. 3,502,610 to Thompson, incorporates only a small amount of a hydraulic cement as an additive to modify the properties of the resin by decreasing its viscosity and imparting flame resistance for use in fiberglass composites. It has been assumed that large proportions of hydraulic cements will not produce these composites. It was not recognized that small amounts of resin could be added to cement mixtures to effect durable bonds to wood. Various latex compositions are marketed which are intended to improve the adhesion of cement to different substrates but the bond to wood is not durable.

OBJECTS

It is therefore an object of the present invention to provide novel composite products which are formed by adhesive action using a resinated hydraulic cement binder, preferably with the cement as the major phase on the binder, for bonding wood. It is further an object of the present invention to provide multiple wood piece-cement composite products which are stronger and more durable than current art wood-cement composites, and which can be made at lower densities and binder ratios and in which the binder may or may not be in continuous phase depending upon the configuration of the wood pieces. It is further an object of the present invention to provide a method for forming the composite products where the wood does not have to be pretreated prior to mixing with the cement binder. These and other objects will become increasingly apparent by reference to the following description.

GENERAL DESCRIPTION

The present invention relates to a composite product which comprises at least one piece of wood bonded with a binder including a hydraulic cement containing a thermoset resin formed at wood-cement interfaces, wherein the cement with the resin bonds to the wood such that the composite product is strong and durable. The present invention also relates to the method for forming a composite product which comprises: providing in contact at least on piece of wood and a curable binder composition which comprises water, a hydraulic cement, and a thermosetting resin precursor, wherein the composition is preferably primarily cement; and curing the binder to form the composite product, wherein the thermoset resin precursor cures to form a thermoset resin at wood-cement interfaces and provides adhesion such that the product is strong and durable. This invention particularly relates to novel composite products comprised of multiple wood elements in various forms of subdivision, consolidated with resinated hydraulic cements, wherein a number of synergistic actions combine to produce composites having high strength and durability at relatively low cost and reduced processing difficulty.

Various types of wood materials in the form, for example, of sheets, strands, or fibers, are united by means of the resinated cement bonding agent. My U.S.

Pat. Nos. 3,552,263 and 3,671,377 illustrate preferred forms of fibrillated wood sticks which can be used. U.S. Pat. Nos. 3,674,219 and 3,718,285 illustrate other means for forming multiple pieces of wood for bonding.

Because they are man-made mixtures, composites lend themselves to ingredient variations as a means of achieving compromises with such factors as cost, strength, and durability, with high strength and durability usually being associated with high cost. In addition to direct materials cost, the bonding agent also introduces indirect costs as a result of application and curing requirements, (e.g. amounts, heat, pressure and time). The indirect costs can sometimes override the original purchase cost of the binder.

In certain multiple wood-piece composites, such as for example particleboard, a relatively small proportion of binder, 5 to 10% is used. Often this represents the highest single cost item in the composite. Moreover, the requirement of high heat and pressure for a substantial period of time commits the process to high capitalization in pressing and heating equipment in order to achieve viable output capacity. Furthermore, the use of high pressure mandated by the need to compress surfaces together in order to obtain bonding with a low amount of expensive binder, produces a latent instability in the product which is particularly evident when it is soaked in water, and this limits its utility.

The composite products of the present invention derive strength and durability at relatively low cost, primarily as a result of synergistic actions of the resinated cement binder component in contact with the wood. In addition, low processing costs are assured by the elimination of heating as a requirement in the consolidation stages, (although of course heat can be used as with other processes to speed up the cure of the binder).

The binder used in the instant composite is made up of two main ingredients, one is a hydraulic cement which solidifies or sets by an independent mechanism and contributes bulking, filling and extender functions; and the other is a thermoset resin which confers primarily the cement-wood adhesion function but also can modify the properties of the cement. Various other additives can be incorporated for their known purposes to produce special effects such as latexes to alter rheological properties, foaming agents to expand the cement and reduce density and fillers. In general, the composite products of the present invention will not disintegrate upon soaking in water for extended periods of time usually related to the durability of the bond.

The chief property of the cementitious fraction is hardening by hydration with water or other mechanisms as is well known to those skilled in the art. Thus all the so-called hydraulic cements such as Portland, alumnite, plaster of Paris, Pozzolanic and Selenitic can be used and others such as those described in the previously referred to U.S. Patents. The preferred cement is Portland. In the case of the thermoset resin fraction, the major requirement in addition to adhesionability and compatibility, is hardening in an alkaline medium. The phenolic resins are preferred which include any of the polymers or copolymers of resorcinol and/or phenol with an aldehyde such as formaldehyde or paraformaldehyde. These resins can be provided as prepolymers in powdered form which can be blended with the cement and cured in the presence of water in situ. One preferred embodiment of the bonding agent in my invention is comprised of a mixture of 60% hydraulic cement, 10% phenolic resin precursor, and 30% water. In addition to the phenolic resins, a wide assortment of mono-, di- and tri-hydric benzenes, benzene derivatives and condensed benzenes in various polymeric combinations are sufficiently reactive with a number of aldehydes to suitably resinate the cement under alkaline conditions. Thompson U.S. Pat. No. 3,502,610 discloses many other thermoset resins.

The aldehydic reaction products of resinating hydroxyphenyl compounds as a broad class within which the above disclosed compounds are included are particularly adhesive to lignocellulosic materials, herein referred to as "wood", and form bonds which are considered to be the most durable attainable. Little or no actual adhesion occurs between a hydraulic cement and wood, although a limited degree of bonding of the mechanical or interlock type can be achieved under certain conditions of pressure and pretreatment of the wood pieces to provide penetration and compatibility. The addition of a thermosetting resin to cement in the manner described herein produces durable bonds with the wood much superior to that of other additives commonly employed for this purpose.

It has been found that the binder compositions of the present invention have a synergistic action when applied to wood. The thermoset resin fraction tends to concentrate at the boundary between the wood and the cement, creating a resin-rich interface. Under magnification the preferred phenolic formaldehyde resins can in fact be seen to have migrated into the wood structure as clear amber tendrils sometimes extending for some distance from the binder mass. Thus the thermoset resin disposes itself at the precise point to achieve maximum adhesion, a function which the cementitious fraction cannot accomplish.

At the same time, the thermoset resin performs another function of benefit to the cementitious fraction. By virtue of its comparatively fast hardening action in the alkaline medium provided by the cement, the resin tends to seal the wood surface against egress of constituents harmful to the hydration of the cement. In general the over-all fast-setting of the binder minimizes interference to hydration normally associated with wood piececement interactions in composites.

Within the binder mass, more actions of mutual benefit occur between the resin and the cement. Hydraulic cements require an uptake of water in order to hydrate and harden. Hydroxyphenyl and aldehyde derived thermoset resins on the other hand optimally require dehydration by condensation in order to harden and develop maximum strength and durability. Hydration and dehydration therefore occur as complementary actions between the components of the binder.

There is also a strong contribution of the wood to the general consolidation process. Since wood is inherently hygroscopic, it serves as a constant modulator of the reactions in the binder which are water dependent, particularly when the wood pieces are interspaced throughout the composite product.

In the preferred embodiment of my invention, the cement-resin precursor ingredients are first premixed and then blended with wood pieces previously reduced to the appropriate form and size. The mixture is then formed to the desired shape and allowed to harden or set. Setting occurs in minutes or days depending upon the proportion of binder components used. Laminates involving sheets are merely clamped together.

A number of different procedures and compositions may be used as illustrated by the following Examples. It should be anticipated that the Examples given are not exhaustive but only illustrative of the versatility and utility of the product and process, and that other procedures and compositions can be deduced therefrom. Formulations 1 to 9 characterize the binder formulations that can be used in the present invention. Comparative Example 1 shows lack of bonding of concrete alone with wood pieces. Comparative Examples 3 to 5 show that modifications with prior art latexes do little to enhance bonding which will survive when soaked in water.

FORMULATION 1

100 parts of Portland cement were mixed with 40 parts of water. The mixture passed through the normal false set and paste stage, eventually solidifying overnight, and with continued hydration arrived at a very hard state as expected.

FORMULATION 2

The mixture of Formulation 1 was modified by adding 10 parts of resorcinol and 5 parts of paraformaldehyde to the cement-water slurry. This mixture became very hot and solidified in less than 5 minutes with the surfaces a dark red color, indicating a concentration of resin on the surface.

FORMULATION 3

The mixture of Formulation 2 was modified by first premixing the resorcinol and paraformaldehyde with the cement and then adding the water. A fast solidification again occurred, and the surface became progressively redder as before with the hardening action.

FORMULATION 4

The mixture of Formulation 2 was modified by substituting formalin (formaldehyde solution) for paraformaldehyde. Similar solidification ensued, producing the same reddish color on the surface due to resin concentration.

FORMULATION 5

The mixture of Formulation 2 was modified by using a preformed resorcinol-formaldehyde resin or prepolymer (Koppers Co. G1131) in place of the resorcinol at the same resin solids concentration. This mixture hardened in about 10 minutes. Again a rich red color appeared on the surface.

FORMULATION 6

The mixture of Formulation 2 was modified by using a preformed phenol-resorcinol resin or prepolymer (Koppers Co. G1292) as in Formulation 5, with similar results.

FORMULATION 7

50 parts of Portland cement were mixed with 10 parts of resorcinol and 20 parts of water, forming component A. To a second quantity of 50 parts Portland cement was added 5 parts of paraformaldehyde and 20 parts of water, forming component B. Components A and B were then mixed in equal quantities, producing the same result as in Formulation 2.

FORMULATION 8

The mixture of Formulation 2 was modified by substituting 75 parts of fly ash for an equal amount of cement. Although setting time was slower, similar results ensured.

FORMULATION 9

100 parts of Portland cement were mixed with 50 parts of a resorcinol-formaldehyde-rubber latex composition as used in tire cord bonding. This mixture, containing about 1% resin, was slow in hardening, but when fully cured it had the characteristic reddish color of the resin and exhibited rubbery properties.

In the following Examples, Formulation 2 was used for the composite products of Examples 2, 8, 9 and 10 and Formulation 9 was used in Examples 6 and 7. It will be appreciated that Formulations 3 to 8 could be used equally as effectively.

COMPARATIVE EXAMPLE 1

The mixture of Formulation 1 was applied as an adhesive to birch veneer and clamped overnight. No bond resulted; the veneers fell apart upon handling out of the clamps.

EXAMPLE 2

The mixture of Formulation 2 was applied as an adhesive to birch veneers and clamped overnight. The veneers were bonded firmly together. Soaking in water did not result in separation of the veneers. Examination of the glue line under magnification showed the wood interface to be interdiffused with reddish colored resin. Similar results were obtained with the other resinated mixtures.

COMPARATIVE EXAMPLE 3

100 parts of Portland cement were mixed with 40 parts of a mixture comprised of two parts Elmers$_{T.M.}$ Concrete Bonder (Borden Chemical Co. Columbus, Ohio) to one part water as specified in the directions given for maximum fortification. This mixture was applied as an adhesive to birch veneer and clamped overnight. The veneers were firmly bonded together. After seven days conditioning, the bonded assembly was soaked in water for 24 hours. Complete delamination resulted.

COMPARATIVE EXAMPLE 4

Rutland Lex-Crete$_{T.M.}$ (Rutland Fire Clay Co., Rutland, Vt.) was mixed, 1 part liquid latex to 3 parts cement mixture as directed, and applied as an adhesive to birch veneer. When the composite was clamped overnight, the binder hardened but no bond resulted.

COMPARATIVE EXAMPLE 5

Top in Bond$_{T.M.}$ (Campbell Products Co., Towson, Md.) was mixed according to directions and applied as an adhesive to wood veneer as in Comparative Example 3. Clamped overnight, hardening occurred but no bonding.

The cement mixtures of Examples 3, 4 and 5 are comprised of various latexes such as polyvinyl, rubber, and acrylic, but do not produce durable bonds with wood.

EXAMPLE 6

The mixture in Formulation 9 was used as an adhesive on birch veneer, good bonding resulted which withstood soaking in water.

EXAMPLE 7

100 parts of the mixture in Formulation 9 were mixed with 100 parts of small wood sticks, and pressed between plates overnight. With additional curing time, the resulting composite product became well consolidated and did not disintegrate upon soaking.

EXAMPLE 8

100 parts of the mixture in Formulation 2 was mixed with 100 parts of wood sticks and pressed between plates overnight. This composite product was also well consolidated, and could be soaked in water after fully curing, without dissolution.

EXAMPLE 9

To a mixture as in Formulation 2 was added 5 parts of aluminum powder, and 2 parts of a surfactant (Polysorbate or Tween 80$_{T.M.}$) to disperse the powder and control bubble formation. The mixture exothermed to steaming temperature and foamed, producing a hardened material of 40 pounds per cubic foot density. Blending of this mixture with wood sticks produced a lighter weight composite product than Example 8. Other foaming agents or air entraining agents besides aluminum are well known to those skilled in the art and can be used so long as they do not interfere with the wood piece-cement bond.

EXAMPLE 10

The procedure of Example 8 was modified by first premixing the finely ground components of the binder, cement, resorcinol, and paraformaldehyde; the water was added separately to the wood sticks. The binder, still in powder form, was then blended with the water-laden sticks. Pressed between plates this composite product hardened as before, and had similar properties. As can be surmised, the procedure allows more time for placement and forming, but requires more time to harden. Also part of the water can be mixed with the binder to provide good results.

The above Examples illustrate the process and the properties of thermoset resinated cement-wood composites. The Examples selected were those having relatively low cost and therefore present preferred compositions. However, the bonding component can be varied to achieve different properties and costs. The cement-thermoset resin binder is amenable to a wide range of proportioning usually from between about 1 part resin to 99 parts cement and about 51 parts cement and 49 parts resin per 100 parts of the combination. The cement is preferably the major phase in the binder and generally the preferred binders contain less than 20 parts resin to 80 parts cement by weight. The word "cement" includes additives such as fly ash. The composite can be comprised of wood piece binder ratios of 1:4 up to about 4:1. Obviously the degree of resination and wood-binder ratios will affect cost and properties of the composite, as well as the process of forming the composite. Since the cement lowers the cost but contributes no adhesion while the resin increases the cost but provides the adhesion, cost and adhesion rise together and must therefore be compromised against anticipated performance demands. While I have found formulations containing as little as 1% resin to be useful, most applications, particularly those in which both binder and wood are discontinuous phases as in laminates, achieve greater strength with higher proportions of resin.

I claim:
1. The composite product which comprises:
   (a) at least one piece of wood or other lignocellulosic material bonded with a binder including
   (b) a hydraulic cement containing
   (c) a thermoset resin formed at wood-cement interfaces, wherein the thermoset resin is prepared from a hydroxyphenyl resin forming compound or prepolymer which is thermoset with an aldehyde in an aqueous alkaline medium provided by a settable mixture of the cement in water and is thermosettable at room temperatures, wherein the cement is the major phase and the resin is the minor phase in the binder, wherein the wood piece to binder ratio is between about 1:4 and 4:1 parts by weight and wherein the cement with the resin bonds to the wood such that the composite product is strong and durable.
2. The product of claim 1 wherein the hydroxyphenyl resin forming compound is resorcinol or phenol-resorcinol copolymers or mixtures thereof thermoset with formaldehyde or paraformaldehyde or mixtures thereof as the aldehyde.
3. The product of claim 1 wherein multiple pieces of wood are dispersed throughout the composite.
4. The method for forming a composite product which comprises:
   (a) providing in contact at least one piece of wood or other lignocellulosic material and a curable binder composition which comprises water, a hydraulic cement and a thermosetting resin precursor which forms a thermoset resin, wherein the thermoset resin is prepared from a hydroxyphenyl resin forming compound or prepolymer which is thermoset with an aldehyde as the precursors in an aqueous alkaline medium provided by a settable mixture of the cement in water and is thermosettable at room temperatures and wherein the cement is the major phase and the resin is the minor phase in the binder; and
   (b) curing the binder to form the composite product, wherein the thermoset resin precursor cures to form a thermoset resin at the wood-cement interfaces and provides adhesion such that the composite product is strong and durable.
5. The method of claim 4 wherein multiple pieces of wood are formed by cutting, cleaving or tearing larger pieces of wood to form sticks, strands or fibers.
6. The method of claim 4 wherein the thermoset resin precursor is resorcinol or a phenol-resorcinol copolymer or mixtures thereof with an aldehyde which cures to form the thermoset resin.
7. The method of claim 4 wherein the thermosetting resin precursor is resorcinol, resorcinolic prepolymer or mixed resorcinolic and phenolic prepolymers admixed with the cement along with the aldehyde as a premix before mixing with the wood or the water.
8. The method of claim 4 wherein water is admixed with a mixture of the cement, the aldehyde and the hydroxyphenyl resin forming compound which reacts with the aldehyde and are then blended with multiple pieces of the wood.

9. The method of claim 4 wherein the water is blended separately with multiple pieces of the wood and the blend is added to a premix of powdered cement and thermosetting resin precursor.

10. The method of claim 4 wherein part of the water is blended with multiple pieces of the wood separately and wherein the balance of the water is mixed with a mixture of powdered cement, the aldehyde and the hydroxyphenyl resin forming compound which reacts with the aldehyde and then are blended with the wood pieces.

11. The method of claim 10 wherein the hydroxyphenyl resin forming compound is phenol, resorcinol or mixtures thereof and the aldehyde is formaldehyde or paraformaldehyde.

12. The method of claim 5 wherein the pieces of wood and binder are pressed during curing.

* * * * *